Figure 1:
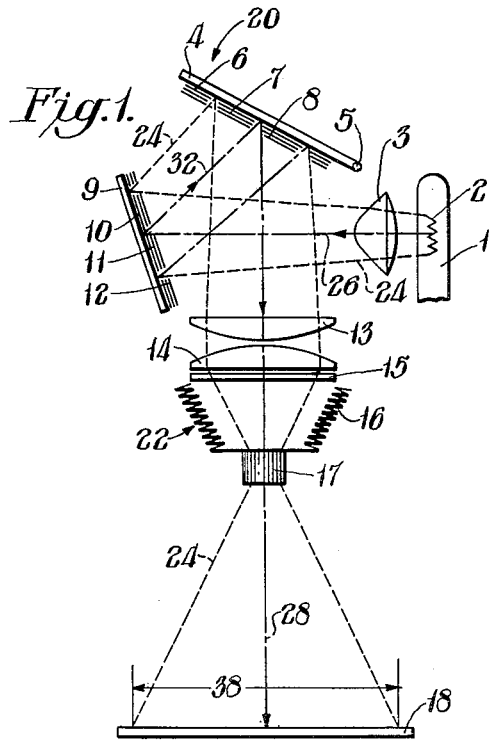

INVENTORS
Julius Durst
Leopold Muhlogger
BY Connolly and Hutz
ATTORNEYS

United States Patent Office 3,161,107
Patented Dec. 15, 1964

3,161,107
ILLUMINATING SYSTEM FOR PHOTOGRAPHIC ENLARGER
Julius Durst and Leopold Muhlogger, Bressanone, near Bolzano, Italy, assignors to Durst S.p.A. Fabrica Macchine ed Apparecchi Fototecnici, Bolzano, Italy
Filed July 24, 1961, Ser. No. 126,045
Claims priority, application Italy Sept. 20, 1960
5 Claims. (Cl. 88—24)

This invention relates to an illuminating system for a photographic enlarger which utilizes a condenser lens, and it more particularly relates to such a system in which the effective light distance from the light source to the condenser lens is varied in accordance with the scale of enlargement.

In an illuminating system for a photographic enlarger employing condenser lenses such as convex lenses in contrast to a system employing scattered light without the use of a condenser lens, it is advantageous to be able to vary the effective light distance from the light source to the condenser lens as the enlargement scale varies. When the enlargement scale is relatively large, the effective light distance from the source to the condenser lens should be relatively long; and when the enlargement scale is relatively smaller this light distance should be relatively less. When, for example, it is necessary to enlarge a fairly large transparency, such as a negative measuring 18 x 24 cm., it is accordingly necessary to move the light source a considerable distance away from the condenser lens, which in addition to the relatively large diameter of the lamp itself requires unduly bulky apparatus which, for example, makes a vertically constructed apparatus unduly high.

An object of this invention is to provide a compact illuminating system for a photographic enlarger, which permits the effective light distance from the source to the condenser lens to be varied in accordance with variation in the scale of enlargement.

Another object is to provide such a system which permits a double filtering effect to be applied to the light rays.

In accordance with this invention the optical axis of the source of light is disposed at an angle and reflectively rotated into line with the optical axis of the enlarger. This reflective rotation is accomplished by either one or both of a pair of mirrors. When both mirrors are used, they successively reflect the rays from the light source into line with the optical axis of the enlarger, and one of these mirrors is separately interposed into the path of the light rays for independently and directly accomplishing that same purpose. When the light rays are successively reflected between both mirrors, the effective light distance from the source to the condenser lens is relatively long; and when the light rays are directly reflected from the directly interposed mirror, the effective light distance is relatively short. This permits variation in effective light distance without the necessity of movng the light source. Colored filters may be inserted in front of each of the mirrors, and their double reaction upon the light rays impinging upon and reflected from the mirrors provides an augmented filtering effect.

Figure 2:
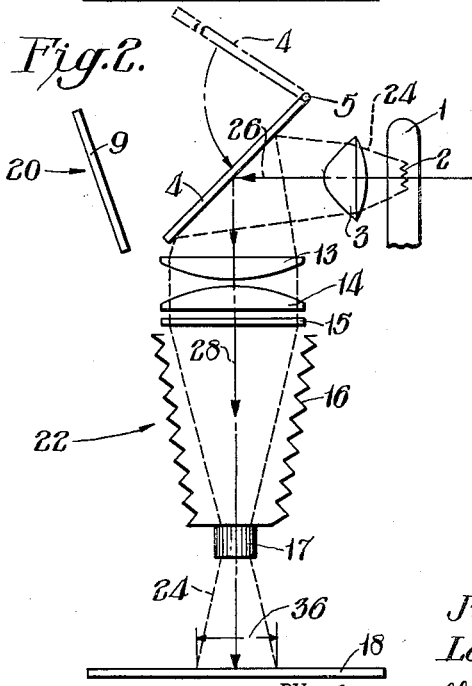

Novel features and advantages of the present invention will become apparent to one skilled in the art from a reading of the following description in conjunction with the accompanying drawings wherein similar reference characters refer to similar parts and in which:

FIG. 1 is a schematic diagram of one embodiment of this invention in the condition providing a relatively longer effective light distance from the source to the condenser; and FIG. 2 is a schematic diagram of the embodiment shown in FIG. 1 in the condition in which a relatively shorter effective light distance is provided from source to condenser.

In FIGS. 1 and 2 is shown an illuminating system 20 for a photographic enlarger 22 including a lamp 1 having a glowing filament 2, which emits a cone of light rays which are indicated by broken lines 24. These light rays are directed by a concentrating means, such as convex lens 3, along the optical axis 26 of concentrating means 3 which is disposed at an angle to the optical axis 28 of enlarger 22. Means are provided for rotating the light rays from axis 26 to axis 28 and include a first reflecting mirror 9 and a second reflecting mirror 4. Second mirror 4 is movably mounted, for example, upon a rotatable hinge 5 to permit it to be moved from the position shown in FIG. 1 to that shown in FIG. 2.

In the position shown in FIG. 1, mirror 4 is pivoted out of the path of light rays 24 directly emitted from light source 2, and it is only intermediately interposed into the path of light rays reflected from mirror 9, which it then reflects into line with the optical axis 28 of the enlarger. The successive reflections from mirrors 9 and 4 provide a relatively larger effective light path from source 2 to condenser lens components 13 and 14, which are disposed along optical axis 28 for concentrating light rays 24 into objective lens 17. Objective lens 17 is mounted in light tight relationship with the plane of a transparency, such as negative 15, by movable bellows 16 to project its image upon projection surface 18.

Mirrors 9 and 4, as shown in FIG. 1, are set at the required angles to rotate the light rays emitted along axis 26 from source 2 through successive reflections 28 of the enlarger through an intermediate axis 32.

In FIG. 1 are also shown colored filters 6, 7 and 8 inserted in front of mirror 4 and colored filters 10, 11 and 12 inserted in front of mirror 9. These filters provide a doublefold filtering effect upon the light rays impinging and reflected from both of the mirror surfaces.

In FIG. 2 mirror 4 is shown in its direct reflecting interposition into the path of light rays 24, and in this condition mirror 4 alone directly reflects light rays 24 from axis 26 to axis 28 without the use of mirror 9.

In FIG. 2 colored filters 6, 7 and 8 have been removed from in front of mirror 4 to facilitate its rotation into its direct reflecting interposition. However, some means could be provided to maintain them in front of mirror 4 or to reinsert them after its rotation, if desired. In FIG. 2 the relatively short width 36 of the cone of light rays 24 impinging upon projection surface 18 indicates a relatively smaller scale of enlargement corresponding to the relatively shorter effective light distance from light source 2 to condenser components 13 and 14 by the single path of reflection provided in FIG. 2. This is in contrast with the relatively greater width 38 of the cone of light rays 24 impinging upon light projecting surface 18 in FIG. 1, which is provided by the longer effective light path from light source 2 to condenser components 13 and 14 by the double reflection of light rays 24 from both mirrors 9 and 4. This invention accordingly permits the effective light path from source to condenser to be easily varied in accordance with the scale of enlargement without physically moving the light source.

What is claimed is:
1. An illuminating system for a photographic enlarger having an optical axis into which a transparency is inserted for projection comprising a light source, a condenser lens disposed along said optical axis, the optical axis of said light source being disposed at an angle relative to said optical axis of said enlarger, a pair of mirrors disposed between said light source and said condenser lens in the path of light rays issuing from said light source to provide means for reflectively rotating said light rays from said light source into line with said optical axis of said enlarger, one of said mirrors being movably mounted to permit said reflective rotation to be alternatively accomplished by one of said mirrors or by successive reflections by both of said mirrors whereby a relatively larger effective light distance from said light source to said condenser lens is provided by successive reflections from both of said mirrors and a relatively shorter effective light distance from said light source to said condenser lens is provided by direct reflection from one of said mirrors.

2. An illuminating system as set forth in claim 1 wherein a concentrating lens is mounted in front of said light source.

3. An illuminating system as set forth in claim 1 wherein the second mirror of said pair from said light source is rotatably mounted to swing from an intermediate reflecting interposition to a direct reflecting interposition.

4. An illuminating system as set forth in claim 1 wherein colored filters are provided for insertion in front of each of said mirrors, and said filters being inserted in the path of said light rays impinging upon said mirrors for reacting twice upon said light beams as they pass to and from said mirrors.

5. An illuminating system as set forth in claim 4 wherein said colored filters are removable to permit said second mirror to be moved into said direct reflecting interposition.

References Cited in the file of this patent
UNITED STATES PATENTS

| | | |
|---|---|---|
| 864,418 | Goodrich | Aug. 27, 1907 |
| 2,447,724 | Weisglass | Aug. 24, 1948 |
| 2,480,101 | Weisglass | Aug. 30, 1949 |
| 3,028,483 | Simmon | Apr. 3, 1962 |